US008824453B2

(12) United States Patent
Li et al.

(10) Patent No.: US 8,824,453 B2
(45) Date of Patent: Sep. 2, 2014

(54) METHOD AND APPARATUS FOR MANAGING QUALITY OF SERVICE FOR MULTIMEDIA APPLICATIONS

(75) Inventors: Zhi Li, San Ramon, CA (US); Ganesh Krishnamurthi, Danville, CA (US); Raj Savoor, Walnut Creek, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 2143 days.

(21) Appl. No.: 11/279,801

(22) Filed: Apr. 14, 2006

(65) Prior Publication Data
US 2007/0242655 A1    Oct. 18, 2007

(51) Int. Cl.
*H04L 12/66* (2006.01)
*H04L 12/24* (2006.01)
*H04L 12/56* (2006.01)

(52) U.S. Cl.
CPC ............. *H04L 12/24* (2013.01); *H04L 47/10* (2013.01); *H04L 41/00* (2013.01)
USPC ........ 370/352; 370/229; 370/230; 370/230.1; 370/232; 370/238; 370/395.21; 370/401

(58) Field of Classification Search
CPC ..... H04L 41/0816; H04L 47/10; H04L 47/70; H04L 65/80; H04L 12/2881; H04L 2209/60; H04L 43/0852; H04L 43/0876; H04L 43/0882; H04L 45/3065; H04L 47/12; H04L 47/2408; H04L 47/2416; H04L 47/801; H04L 47/805; H04L 47/821; H04L 65/1066; H04L 63/1441; H04L 41/5054; H04L 63/1408; H04L 12/2883; H04L 2012/6478; H04M 2242/06; H04M 3/005; H04M 3/007
USPC ...................... 370/352–356, 229, 230, 230.1, 370/232–235, 238, 395.21
See application file for complete search history.

(56) References Cited

U.S. PATENT DOCUMENTS

| 6,640,239 | B1 * | 10/2003 | Gidwani ....................... 709/203 |
| 6,971,057 | B1 | 11/2005 | Delvaux et al. |

(Continued)

FOREIGN PATENT DOCUMENTS

WO    2005036919    4/2005

OTHER PUBLICATIONS

Microsoft Corporation, "Quality of Service and DSL Network Solutions", Website last visited Apr. 14, 2006, http://www.microsoft.com/whdc/archive/qos-dls.mspx?pf=true.

(Continued)

*Primary Examiner* — Melanie Jagannathan
*Assistant Examiner* — Najeebuddin Ansari
(74) *Attorney, Agent, or Firm* — Guntin & Gust, PLC; Jay H. Anderson

(57) ABSTRACT

A system and method (200) are disclosed for managing quality of service for multimedia applications. A system that incorporates teachings of the present disclosure may include, for example, a network management system (NMS) (106) having a controller (107) that manages operations of a Digital Subscriber Line Access Multiplexer (DSLAM) (109) interfacing to a digital subscriber line (DSL) modem (114) over a digital subscriber line. The controller can be programmed to detect (204) a signal quality violation in the digital subscriber line according to a quality policy associated with a content source, cause (210) the DSLAM to interleave content supplied thereto by the content source; and cause (212) the DSLAM to allocate to the content supplied by the content source a first portion of a data service bandwidth assigned to the digital subscriber line. Additional embodiments are disclosed.

18 Claims, 3 Drawing Sheets

(56) References Cited

U.S. PATENT DOCUMENTS

| | | | |
|---|---|---|---|
| 7,739,383 B1* | 6/2010 | Short et al. | 709/226 |
| 2002/0196813 A1 | 12/2002 | Chow et al. | |
| 2003/0012209 A1* | 1/2003 | Abdelilah et al. | 370/412 |
| 2003/0108095 A1 | 6/2003 | Duvaut et al. | |
| 2003/0217182 A1* | 11/2003 | Liu et al. | 709/249 |
| 2004/0136373 A1* | 7/2004 | Bareis | 370/392 |
| 2006/0005224 A1* | 1/2006 | Dunning et al. | 725/115 |
| 2006/0039367 A1 | 2/2006 | Wright et al. | |
| 2006/0143499 A1* | 6/2006 | Ferguson et al. | 714/4 |
| 2006/0153285 A1 | 7/2006 | Modlin | |
| 2006/0198430 A1* | 9/2006 | Rhee et al. | 375/222 |
| 2006/0222008 A1* | 10/2006 | Aaron et al. | 370/468 |
| 2006/0268697 A1* | 11/2006 | Oz et al. | 370/229 |
| 2007/0140113 A1* | 6/2007 | Gemelos | 370/229 |
| 2007/0201446 A1* | 8/2007 | Wright | 370/356 |
| 2007/0230548 A1* | 10/2007 | Van de Wiel et al. | 375/219 |
| 2009/0175199 A1* | 7/2009 | Trojer | 370/254 |

OTHER PUBLICATIONS

Nedev N. et al., " Comparison Between Interleaving and Multiple DMT Symbols per RS Codeword in ADSL Systems", 2002 IEEE Global Telecommunications Conference. Conference Proceedings. Taipei, Taiwan, Nov. 17, 2002, IEEE Global Telecommunications Conference, New York, NY: IEEE, US, vol. 1 of 3, Nov. 17, 2002, pp. 2265-2269.

* cited by examiner

METHOD AND APPARATUS FOR MANAGING QUALITY OF SERVICE FOR MULTIMEDIA APPLICATIONS

FIELD OF THE DISCLOSURE

The present disclosure relates generally to digital subscriber lines, and more specifically to a method and apparatus for managing quality of service for multimedia applications.

BACKGROUND

As broadband services such as IPTV, voice over IP (VoIP), and high speed data communications continue to be deployed to residences and commercial enterprises, quality of service becomes increasingly important to end users. In the transition to digital services, service providers have managed to reuse portions of legacy network equipment. In this mixed technology environment, a need arises for a method and apparatus that manages quality of service for multimedia applications.

DETAILED DESCRIPTION

Embodiments in accordance with the present disclosure provide a method and apparatus that manages quality of service for multimedia applications.

In a first embodiment of the present disclosure, a network management system (NMS) can have a controller that manages operations of a Digital Subscriber Line Access Multiplexer (DSLAM) interfacing to a digital subscriber line (DSL) modem over a digital subscriber line. The controller can be programmed to detect a signal quality violation in the digital subscriber line according to a quality policy associated with a content type, cause the DSLAM to interleave all content supplied to the digital subscriber line; and cause the DSLAM to allocate to content supplied by a content source a first portion of a data service bandwidth assigned to the digital subscriber line.

In a second embodiment of the present disclosure, a computer-readable storage medium in a Digital Subscriber Line Access Multiplexer (DSLAM), can have computer instructions for monitoring a signal quality level of a digital subscriber line coupled to the DSLAM, transmitting the signal quality level to a network management system (NMS), and receiving a request from the NMS to enable interleaving of all content supplied transmitted by the DSLAM upon the NMS detecting a signal quality violation in the signal quality level and determining that a delay to interleave all content on the digital subscriber line is below a delay threshold.

In a third embodiment of the present disclosure, a computer-readable storage medium in a gateway can have computer instructions for enabling processing of interleaved content supplied by a Digital Subscriber Line Access Multiplexer (DSLAM) over a digital subscriber line upon a network management system (NMS) detecting a signal quality violation in the digital subscriber line and determining that the interleaved content has a delay below a delay threshold.

In a fourth embodiment of the present disclosure, a method in at least one among a network management system (NMS), a Digital Subscriber Line Access Multiplexer (DSLAM), and a digital gateway can have the steps of detecting a signal quality violation of a digital subscriber line according to a quality policy associated with a content type, interleaving all content supplied to the digital gateway when a delay incurred by interleaving all content does not exceed a delay threshold associated with the content type, and allocating to content supplied by a content source a portion of a data service bandwidth assigned to the digital subscriber line determined after the interleaving step is enabled.

Figure 1:
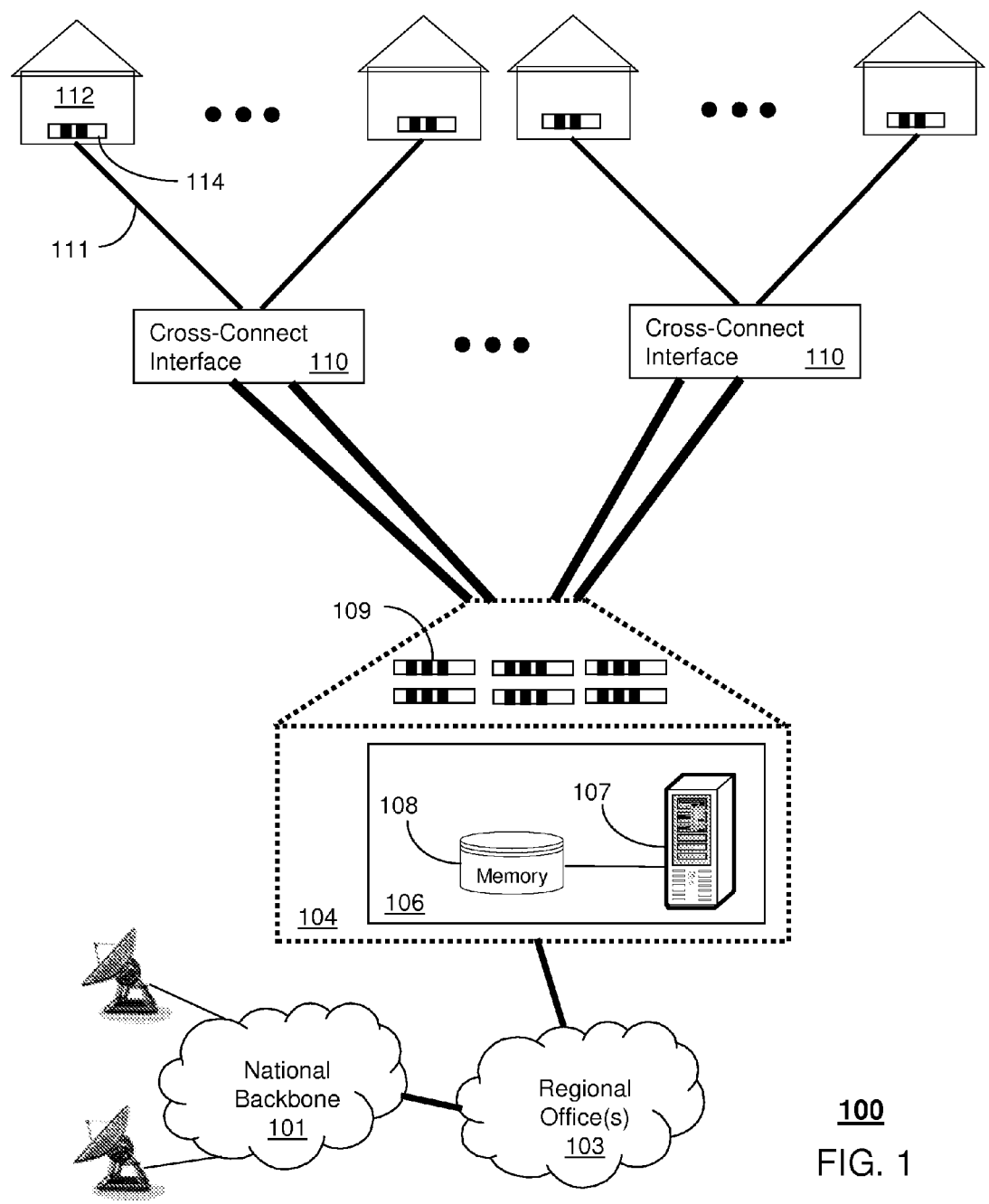
FIG. 1 depicts an exemplary block diagram of communication system offering to residences and commercial enterprises broadband communication services such as IPTV, Voice over IP (VoIP), and high-speed Internet managed in part by a network management system (NMS)

FIG. 1 depicts an exemplary block diagram of communication system 100 offering to residences and commercial enterprises 112 broadband communication services such as IPTV, Voice over IP (VoIP), and high-speed Internet managed in part by a network management system (NMS) 106. The NMS 106 can be utilized for managing a bank of Digital Subscriber Line Access Multiplexers (DSLAMs) which can be programmed by the NMS 106 to exchange with residences or commercial enterprises 112 high-speed Internet data, VoIP content, and/or IPTV content such as multicast or unicast content by way of common cross-connect interfaces (CCIs) 110.

The CCIs 110 in turn supply the IPTV content over a digital subscriber line 111 to a gateway 114 such as a common residential gateway, set top box (STB), or digital subscriber line (DSL) modem located at a residence or commercial enterprise 112. For illustration purposes only, the gateway 114 will be represented as a DSL modem 114. The DSL modem 114, however, can be replaced with other gateway embodiments without departing from the scope of the present disclosure.

The DSLAM 109 is a network device utilizing common computing and communications technology for processing signals from multiple digital subscriber line (DSL) connections 111 and a high-speed backbone 103 using multiplexing and de-multiplexing techniques. DSLAMs 109 can connect DSL lines 111 with a combination of asynchronous transfer mode (ATM), frame relay, or Internet Protocol networks. The DSL modems 114 utilize similar computing and communications technology to modulate and demodulate digital content exchanged with the DSLAM 109.

The IPTV content can be sourced from a national IP backbone 101 commonly known as super head end(s) which can supply content such as HBO, CNN, CBS, NBC, CSPAN, ESPN, etc., nationally to a number of regional offices 103. The regional offices in turn distribute content to local central offices (COs) 104 where content eventually terminates at the end user's residence or commercial enterprise 112. The NMS 106 can serve in part to manage a quality of service over the digital subscriber lines 111 by directing operations of the DSLAMs 109. To perform these tasks, the NMS 106 includes a common controller 107 such as a desktop computer or scalable server and memory 108 having volatile and non-volatile components such as RAM, Flash, and/or a high capacity disk drive. Although the NMS 104 is shown within a CO 104, it can be located remotely, and can be programmed to manage the DSLAMs 109 of more than one CO 104 in accordance with the present disclosure.

Figure 2:
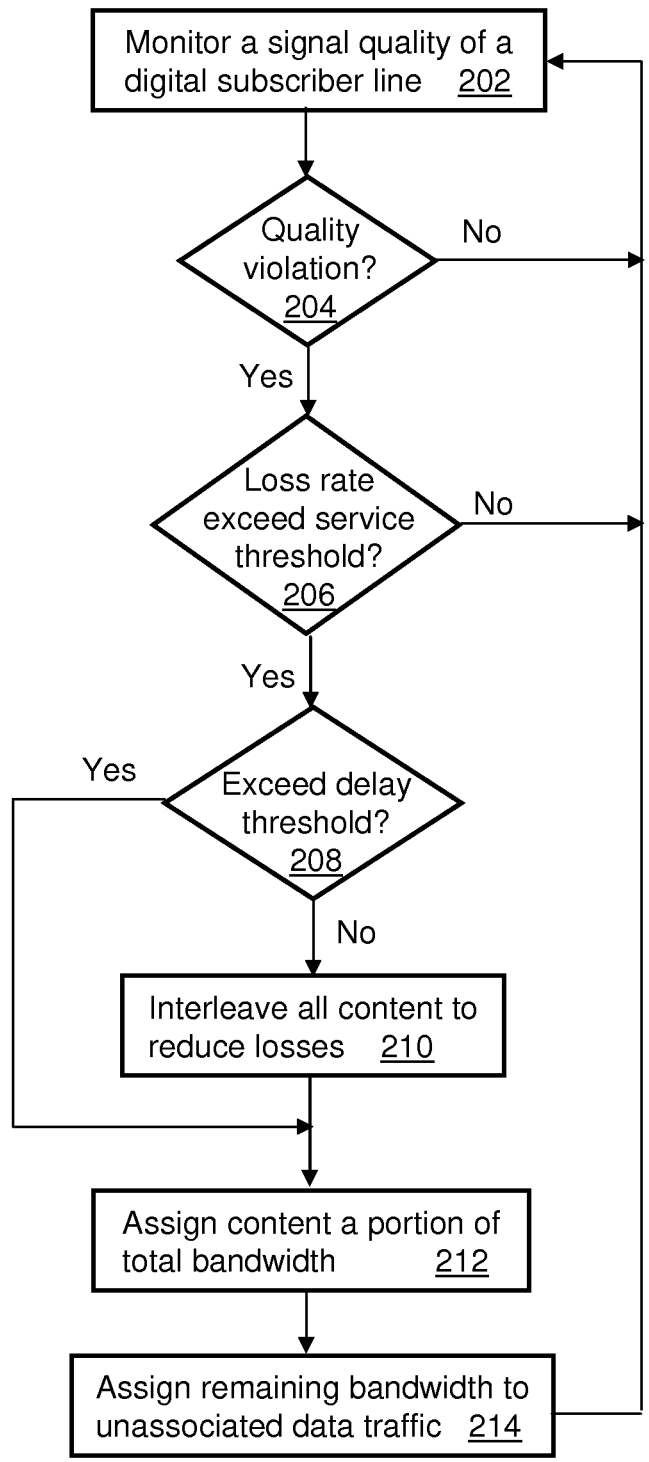
FIG. 2 depicts an exemplary method operating in at least one among the NMS, a Digital Subscriber Line Access Multiplexer (DSLAM), and a digital subscriber line (DSL) modem.

FIG. 2 depicts an exemplary method 200 operating in at least one among the NMS 106, the DSLAM 109, and the DSL modem 114. Method 200 begins with step 202 in which a signal quality of the digital subscriber line 111 is monitored. The signal quality can be measured by the DSL modem 114 and/or the DSLAM 109, which in turn can share said information with the NMS 106. The signal quality can be assessed from any number of signal or communication parameters. These parameters can include without limitation a bit error rate, a cell error rate, a frame error rate, a packet error rate, a signal to noise ratio (SNR), and/or a signal delay.

One or more of these parameters can be compared by the NMS 106 in step 204 to a quality policy to determine if a signal quality violation has occurred. The quality policy is generally associated with a content type which a service provider can specify according to a desired performance in the services rendered to end users. The quality policy can vary depending on the type of content delivered to a residence or enterprise 112. For example, in the case of video content, a noisy DSL line 111 having a high packet loss rate and/or low SNR may be considered by the content provider to unacceptably impact video quality. High definition TV (HDTV) video for instance may be less tolerant to noise than standard definition TV (SDTV). VoIP traffic may be yet more tolerant to noise than SDTV. Accordingly, the quality policy can be defined for a number of content types by establishing corresponding noise thresholds, a maximum packet loss rate, or other forms of quality criteria.

If the NMS 106 detects no signal quality violation in step 204, the monitoring process continues at step 202. Otherwise, the quality violation is compared to a service threshold in step 206. This step can serve to reduce the frequency of adjustments to the operations of a particular DSL line 111. That is, if the signal quality violation detected in step 204 is due to a burst error, or some other form of temporary impairment, the NMS 106 can be programmed to ignore the violation. If on the other hand the quality violation is continuous and unacceptably high for the type of content supplied by a content source, the NMS 106 can be programmed to direct the DSLAM 109 to mitigate the losses. Thus, a service threshold can be defined by a service provider of the DSL line 111 establishing a policy that requires a number of quality violations before adjustments are invoked.

If the service threshold is exceeded by a particular data loss rate, the NMS 106 can be programmed to proceed to step 208. In step 208, the NMS 106 can assess whether interleaving all content transmitted by the DSLAM 109 has been employed on a prior occasion and whether the end-to-end transmission delay of sensitive content such as HDTV is within an acceptable delay threshold. The delay threshold can vary according to the type of content being exchanged. For live VoIP traffic a high delay can distort communications between end users. Similar issues can arise for HDTV. Accordingly, in step 208 the NMS 106 can be programmed to determine if the end-to-end delay is low enough to employ content interleaving to the residence or enterprise for all sources of content supplied thereto.

Content or data interleaving is a common technique that increases resistance to noise bursts on a line. Interleaving smears bits of data by interleaving them over intervals so that a short burst of noise can only remove part of any given data block. Data interleaving combined with common forward error correction schemes can significantly improve a DSL modem's 114 tolerance to noisy DSL lines 111. Interleaving therefore improves the chance that noise on the DSL line 111 will only cause partial damage not a complete loss of communications. Interleaving, however, can increase transmission delay, which is why in step 208 the NMS checks that there's room to add a delay caused by interleaving without distorting communications.

Thus if the NMS 106 determines the end-to-end delay does not exceed a specific delay threshold, the NMS 106 can be programmed to direct in step 210 the DSLAM 109 to invoke interleaving all content transmitted to the residence 112 within the limits of the delay threshold. If on the other hand the delay threshold has been exceeded, the NMS 106 can direct the DSLAM 109 to allocate to a content source a reduced bandwidth from the total bandwidth available on the DSL line 111.

Assume, for example, that the DSL line 111 can support a bandwidth of 5 Mbps (Mega Bits Per Second) with a packet loss rate of 1%. The video rate from the content source may require 2 Mbps with an acceptable packet loss rate of 0.1% or better. Under these conditions, the NMS 106 can, for example, determine from the signal parameters monitored in step 202 that allocating 3 Mbps to the video content will result in a packet loss rate of 0.1% or better. Accordingly, the NMS 106 can be programmed in step 212 to direct the DSLAM 109 to allocate a fixed bandwidth of 3 Mbps to the video, and assign in step 214 the remaining bandwidth to data traffic unassociated with the video content such as web browsing, file transfers, email, etc. If interleaving is employed the total data bandwidth originally available may be reduced from say 5 Mbps to 4 Mbps. Accordingly the data traffic unassociated with the video traffic would be allocated only 1 Mbps of bandwidth. If on the other hand interleaving were not employed the data traffic unassociated with the video traffic would be allocated 2 Mbps of bandwidth.

With content interleaving and/or a reduced bandwidth allocation, high definition content (e.g., HDTV) and/or VoIP services can be offered to end users at acceptable quality levels notwithstanding a lossy or noisy DSL line 111.

It would be evident to an artisan with ordinary skill in the art that method 200 can have multiple embodiments in which portions can be programmed in whole or in part in the NMS 106, the DSLAM 109, and/or the DSL modem 114 (or gateway). For example, in a distributed environment, the DSLAM 109 can be programmed with the steps of method 200 without the use of the NMS 106. In a centralized system, the NMS 106 can serve to manage a multiplicity of DSLAMs 109 rather than place the burden on each DSLAM 109 to manage a DSL line 111 and the thresholds described in steps 204-208. It would be apparent to said artisan therefore that method 200 can be modified, reduced, or enhanced without departing from the scope and spirit of the claims described below. Accordingly, the reader is directed to the claims for a fuller understanding of the breadth and scope of the present disclosure.

Figure 3:
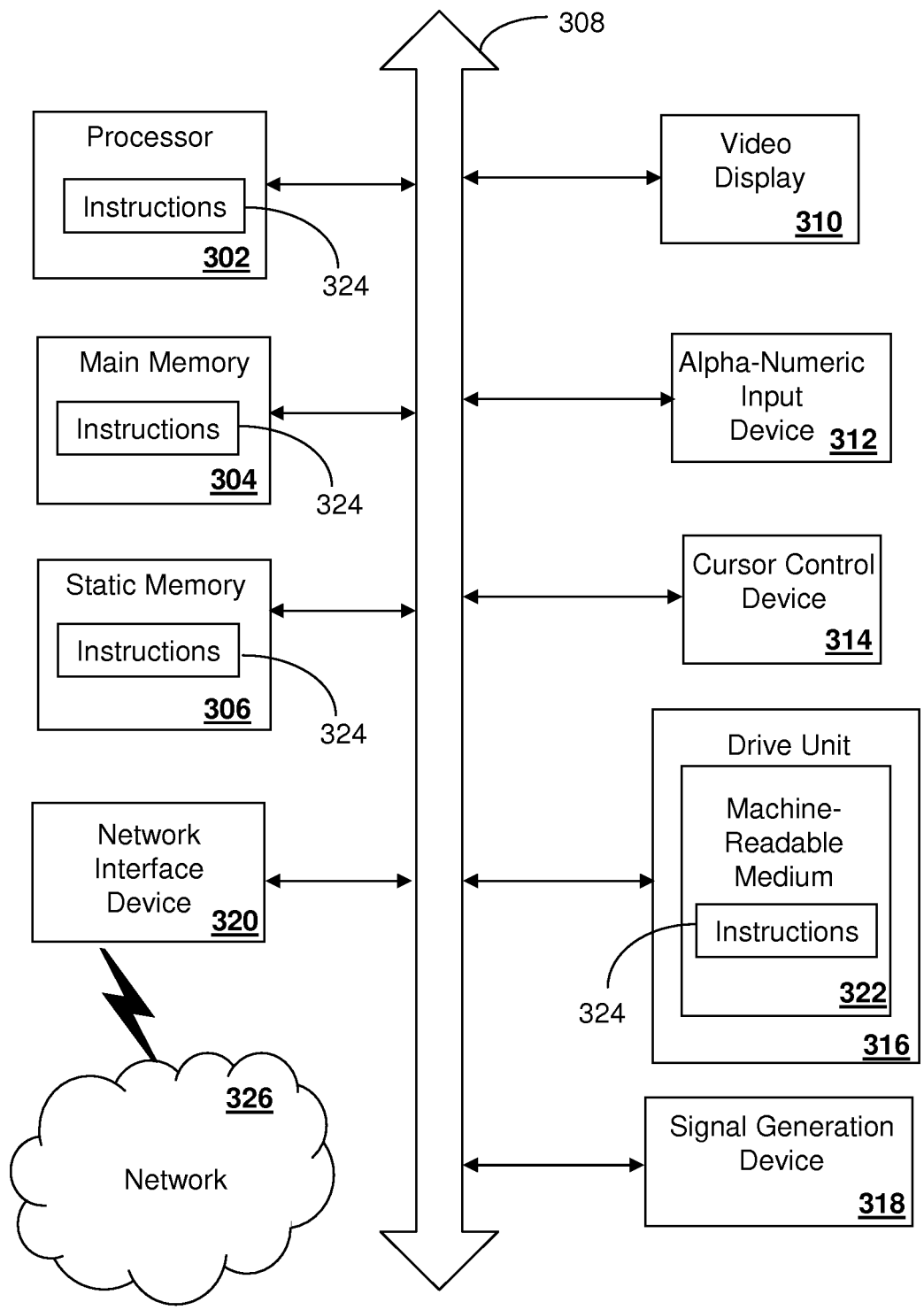
FIG. 3 is a diagrammatic representation of a machine in the form of a computer system within which a set of instructions, when executed, may cause the machine to perform any one or more of the methodologies discussed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network management system, comprising:
a memory storing computer instructions; and
a controller coupled with the memory, wherein the controller manages operations of a digital subscriber line access multiplexer interfacing to a digital subscriber line modem over a digital subscriber line, wherein the controller, responsive to executing the computer instructions, performs operations comprising:
detecting a signal quality violation in the digital subscriber line according to a quality policy associated with a content type, wherein the digital subscriber line transmits a plurality of content types, and wherein each of the plurality of content types has an associated quality policy;
determining a transmission delay associated with interleaving of all content transmitted by the digital subscriber line access multiplexer;
determining whether the transmission delay exceeds a predetermined delay threshold associated with the content type;
responsive to determining that the transmission delay does not exceed the delay threshold, causing the digital subscriber line access multiplexer to interleave all content supplied to the digital subscriber line;
responsive to determining that the transmission delay exceeds the delay threshold, causing the digital subscriber line access multiplexer to allocate to a first content source a first portion of a data service bandwidth assigned to the digital subscriber line for providing first content via the digital subscriber line with a transmission delay not exceeding the delay threshold associated with the content type of the first content and in accordance with the quality policy associated with the content type of the first content, wherein a remaining portion of the data service bandwidth is allocated for remaining traffic, and wherein the remaining traffic is not permitted to utilize the first portion of the data service bandwidth.

2. The network management system of claim 1, wherein the remaining traffic comprises other content from other content sources, and wherein the operations further comprise causing the digital subscriber line access multiplexer to interleave the other content.

3. The network management system of claim 1, wherein the remaining traffic comprises data generated from web browsing and wherein the operations further comprise:
causing the digital subscriber line access multiplexer to monitor a signal quality of the digital subscriber line; and
retrieving the signal quality from the digital subscriber line access multiplexer.

4. The network management system of claim 3, wherein the quality policy comprises a maximum packet loss rate threshold, and wherein the signal quality monitored comprises a communication parameter comprising a bit error rate, a cell error rate, a frame error rate, a packet error rate, a signal to noise ratio, or a signal delay.

5. The network management system of claim 1, wherein the operations further comprise:

determining when the signal quality violation exceeds a service threshold associated with the quality policy;
causing the digital subscriber line access multiplexer to interleave all content it transmits over the digital subscriber line when a potential delay incurred from interleaving content is below the delay threshold and the signal quality violation exceeds the service threshold;
causing the digital subscriber line access multiplexer to allocate to the content the first portion of the data service bandwidth when the signal quality violation exceeds the service threshold; and
causing the digital subscriber line access multiplexer to monitor the digital subscriber line for compliance with the quality policy when the signal quality violation is equal to or less than the service threshold.

6. The network management system of claim 1, wherein the operations further comprise determining the first portion of the data service bandwidth allocated to the content according to a potential interleaving delay incurred by interleaving the content or the signal quality violation.

7. The network management system of claim 1, wherein the operations further comprise causing the digital subscriber line access multiplexer to allocate to the remaining traffic a second portion of the data service bandwidth, wherein the second portion comprises the difference between the data service bandwidth and the first portion of the data service bandwidth.

8. The network management system of claim 1, wherein the first content comprises high definition television.

9. A non-transitory computer-readable storage medium comprising executable instructions and coupled to a controller of a digital subscriber line access multiplexer, wherein the instructions, responsive to being executed by the controller, cause the controller to perform operations comprising:
monitoring a signal quality level of a digital subscriber line coupled to the digital subscriber line access multiplexer, wherein the digital subscriber line transmits a plurality of content types, and wherein each of the plurality of content types has an associated quality policy;
transmitting the signal quality level to a network management system;
interleaving all content transmitted by the digital subscriber line access multiplexer upon detection, by the network management system, of a signal quality violation in the signal quality level according to the quality policy and upon a determination, by the network management system, that a potential transmission delay to interleave content on the digital subscriber line is below a predetermined delay threshold that is associated with a content type of the content; and
upon detection by the network management system of a signal quality violation in the signal quality level according to the quality policy and upon a determination by the network management system that the potential transmission delay to interleave content on the digital subscriber line exceeds the delay threshold, allocating to a first content source a first portion of a data service bandwidth assigned to the digital subscriber line for providing first content via the digital subscriber line with a transmission delay not exceeding the delay threshold associated with the content type of the first content and in accordance with the quality policy associated with the content type of the first content, wherein a remaining portion of the data service bandwidth is allocated for remaining traffic, and wherein the remaining traffic is not permitted to utilize the first portion of the data service bandwidth.

10. The non-transitory computer-readable storage medium of claim 9, wherein the quality policy comprises a maximum packet loss rate threshold, wherein the signal quality level comprises a communication parameter comprising a bit error rate, a cell error rate, a frame error rate, a packet error rate, a signal to noise ratio, or a signal delay, and wherein the potential delay is determined based on monitoring of delays associated with interleaved content previously delivered by the digital subscriber line access multiplexer over the digital subscriber line.

11. The non-transitory computer-readable storage medium of claim 9, comprising executable instructions which when executed by the controller cause the controller to receive a request from the network management system to enable the interleaving.

12. The non-transitory computer-readable storage medium of claim 9, wherein the remaining portion includes data associated with other content from other content providers.

13. The non-transitory computer-readable storage medium of claim 12, comprising executable instructions which when executed by the controller cause the controller to allocate to the first content source the first portion of the data service bandwidth in response to a request from the network management system.

14. A method comprising:
   detecting, using a processor in a network management system, a signal quality violation of a digital subscriber line according to a quality policy associated with a content type, wherein the digital subscriber line transmits a plurality of content types, and wherein each of the plurality of content types has an associated quality policy;
   determining, by the processor, a potential transmission delay associated with interleaving of all content transmitted via the digital subscriber line by a digital subscriber line access multiplexer;
   determining, by the processor, whether the potential transmission delay exceeds a predetermined delay threshold associated with the content type;
   interleaving, by the processor, all content supplied to a digital gateway via the digital subscriber line upon detection of the signal quality violation and when the potential transmission delay incurred by interleaving all the content does not exceed a predetermined delay threshold associated with the content type; and
   upon detection of the signal quality violation and when the potential transmission delay exceeds the delay threshold, allocating, by the processor, to a first content source a first portion of a data service bandwidth assigned to the digital subscriber line for providing first content via the digital subscriber line with a transmission delay not exceeding the delay threshold associated with the content type of the first content and in accordance with the quality policy associated with the content type of the first content, wherein a remaining portion of the data service bandwidth is allocated for remaining traffic, and wherein the remaining traffic is not permitted to utilize the first portion of the data service bandwidth.

15. The method of claim 14, wherein the quality policy comprises a maximum packet loss rate threshold, and wherein the method comprises:
   monitoring signal parameters associated with the digital subscriber line; and
   determining the signal quality violation from a comparison of the signal parameters to the quality policy.

16. The method of claim 14, comprising:
   determining when the signal quality violation exceeds a service threshold associated with the quality policy; and
   interleaving all content when the signal quality violation exceeds the service threshold.

17. The method of claim 14, comprising:
   determining when the signal quality violation exceeds a service threshold associated with the quality policy; and
   allocating to the content supplied by the content source the portion of the data service bandwidth when the signal quality violation exceeds the service threshold.

18. The method of claim 14, wherein the potential delay is determined based on monitoring of delays associated with interleaved content previously delivered over the digital subscriber line.

* * * * *